United States Patent [19]

Harris

[11] 3,872,067

[45] Mar. 18, 1975

[54] PROCESS FOR PREPARING CHLOROMETHYLATED POLYSTYRENE-DIVINYLBENZENE COPOLYMER

[75] Inventor: Nicholas D. Harris, Norwich, N.Y.

[73] Assignee: Morton-Norwich Products, Inc., Norwich, N.Y.

[22] Filed: Sept. 17, 1973

[21] Appl. No.: 398,177

[52] U.S. Cl.............................. 260/80.78, 260/2.1 R
[51] Int. Cl. ............................................. C08f 7/06
[58] Field of Search............ 260/80.78, 87.5 C, 91.5

[56] References Cited
OTHER PUBLICATIONS

Robert Kunin, "Ion Exchange Resins," 1958, (Wiley), pages 79–80.

*Primary Examiner*—Harry Wong, Jr.
*Assistant Examiner*—A. L. Clingman
*Attorney, Agent, or Firm*—Anthony J. Franze

[57] ABSTRACT

The invention described herein provides another process for preparing chloromethylated polystyrene - divinylbenzene copolymer involving the reaction of styrene, vinylbenzyl chloride and divinylbenzene.

1 Claim, No Drawings

PROCESS FOR PREPARING CHLOROMETHYLATED POLYSTYRENE-DIVINYLBENZENE COPOLYMER

This invention relates to a process for preparing chloromethylated polystyrene-divinylbenzene copolymer. This copolymer is useful as a solid support in the preparation of peptides having pharmacological effect (C&EN Aug. 2, 1971).

In the past such copolymer has been prepared by chloromethylation using reactants such as chloromethyl methyl ether or a mixture of chlorosulfonic acid and formaldehyde. Either prior art method is attended with disadvantages such as insidious character of the reactants or the presence of complex mixtures leading to uncertainty in the extent of chloromethylation.

The process of the present invention avoids the disadvantages of those previously employed. It consists in bringing together styrene, vinylbenzyl chloride and divinylbenzene in the presence of a catalyst such as benzoyl peroxide for a brief time. Advantageously, the reaction is carried out in the presence of an inert gas such as nitrogen.

In order that this invention may be readily available to and understood by those skilled in the art, it is briefly set forth by the following example:

Distilled styrene (23.4 g), vinylbenzyl chloride (8.5 g) and divinylbenzene (1.2 g) were mixed with benzoyl peroxide (0.27 g) and added to a preheated, 70°C, stirred solution of polyvinylalcohol (0.7 g) in water (34 ml).

The slurry was stirred, under nitrogen, at 65°–73° for 5 hours, heated to 100° in half an hour and stirred at 100° for 1 hour.

The mixture was filtered, washed with water and methanol and dried to yield 25 g of chloromethylated polystyrenedivinylbenzene copolymer in the form of beads having a percentage elemental analysis of: C, 86.32; H, 7.16 and Cl, 6.6.

What is claimed is:

1. The process for preparing chloromethylated polystyrenedivinylbenzene copolymer which consists in polymerizing styrene, vinylbenzyl chloride and divinylbenzene in the presence of benzoyl peroxide.

* * * * *